UNITED STATES PATENT OFFICE.

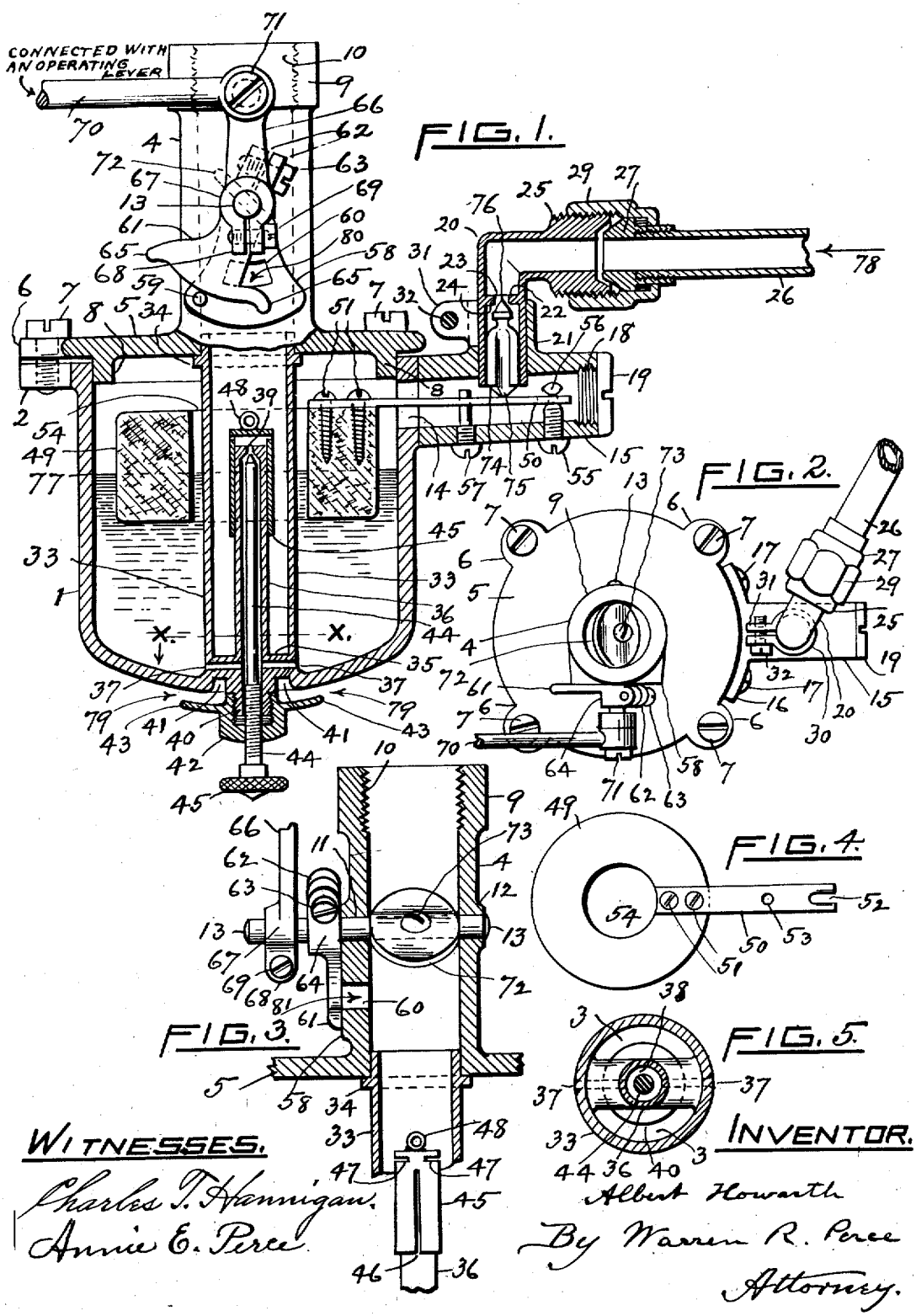

ALBERT HOWARTH, OF PROVIDENCE, RHODE ISLAND, ASSIGNOR TO STAR CARBURETOR & SUPPLY COMPANY, OF PROVIDENCE, RHODE ISLAND, A CORPORATION OF RHODE ISLAND.

CARBURETER.

954,630.  Specification of Letters Patent.  Patented Apr. 12, 1910.

Application filed January 8, 1908. Serial No. 409,781.

*To all whom it may concern:*

Be it known that I, ALBERT HOWARTH, a citizen of the United States, residing at Providence, in the county of Providence and State of Rhode Island, have invented certain new and useful Improvements in Carbureters, of which the following is a specification, reference being had therein to the accompanying drawings.

Like reference numerals indicate like parts.

Figure 1 is a view, partly in elevation and partly in diametrical section, of my improved carbureter. Fig. 2 is a top plan view of the same. Fig. 3 is a view of the throttle valve, throttle valve chamber and connected parts, as seen partly in elevation and partly in section centrally in a plane at right angles to that of Fig. 1. Fig. 4 is a top plan view of the float and its lever arm. Fig. 5 is a detail view, as seen on line $x\ x$ of Fig. 1.

My invention relates to the class of carbureters and especially to those which are used in automobile vehicles, and it consists of the novel construction and combination of the several parts as hereinafter described and claimed.

In the drawings the float chamber is designated 1, and is shaped somewhat like a cup, whose upper edge has a plurality of ear pieces 2, and whose bottom, at the center thereof, has the two openings 3, shown in Fig. 5.

A tube 4 has a circular bore, of uniform diameter and open at both ends. At its base it has an integral circular flange 5, which serves as a cover for the float chamber. The flange 5 has a plurality of ear pieces 6, which register with those of the rim of the float chamber, indicated as 2. Screws 7, passing through the ear pieces 6 and 2, fasten the cover or flange 5 to the top of the float chamber. An annular lip or flange 8 extends down from the cover 5 and lies in contact with the inner edge of the rim of the float chamber. The upper end of the tube 4 is enlarged to form an annular head 9, and the bore thereof, continuous with the bore of the tube 4, is made with a screw thread 10, with which a pipe (not shown) is engaged and leads to the engine. The tube 4 also has two diametrically opposite bosses 11 and 12, which have bores or bearings to serve to support the rotatable valve shaft 13.

The float chamber 1 has an opening 14 near its upper edge on one side. A tubular extension 15 is mounted on the float chamber 1 and extends horizontally and radially therefrom, being supported by means of an integral flange 16, of proper curvature to fit upon the outer surface of the float chamber 1, and secured in position by screws 17, as seen in Fig. 2. The bore of the tubular extension 15 registers with and is in alinement with the opening 14 of the float chamber 1. The outer end of the tubular extension 15 has an interior screw thread, as indicated at 18. A screw cap 19, fitting therein, closes said outer end, as illustrated in Fig. 1.

An L-shaped tube 20 is mounted rotatably at its lower end in a boss 21, which has a circular aperture for that purpose. This lower end of the tube 20 extends down into the tubular extension 15 and opens therein. An annular interior flange 22 is formed in the upright portion of the tube 20 and has a central aperture 23, which constitutes a valve seat 24.

The outer or upper end of the tube 20 has an annular enlargement or head 25, which is provided with an exterior screw-thread, and its outer end is dished or made with a conical depression. A feed pipe 26, has an exterior screw thread at its inner end. A tubular cap 27 has an interior screw thread, by which it engages said threaded end of the feed pipe 26. The cap 27 has its end beveled, as seen in Fig. 1, to conform to the conical depression in the head 25 of the tube 20. A coupling 29, engaging with the head 25 and with the cap 27, makes the joint tight.

The tubular boss 21 has two integral ears 31, separated from each other by a slot, and these ears are drawn together by the screw 32 and tighten the tube 20 in position.

A tube 33, constituting a gasolene mixing chamber, extends vertically within the float chamber 1 in an axial direction. Its upper end is open and fits into the lower end of the bore of the tube 4. An annular flange 34 is provided upon the outer surface of the tube 33, near its upper end, upon which the flange or cover 5 rests. A web 35, which is preferably of uniform width, extends across the open bottom of the tube 33, and is integral with said tube.

A feed tube or nozzle 36 is supported by the web 35 vertically and axially in the float chamber 1. There are two ducts or passages 37 extending through the web 35 in a line diametrical of the tube 33, which ducts or passages open into the bore 38 of the tube 36, as seen in Figs. 1 and 5. The upper end of the tube 36 is closed, except that said end has a central opening or valve seat 39, shown in Fig. 1, which valve seat is conically enlarged in a downward direction, as there represented. The web 35 also has a central circular boss 40 depending therefrom, and shouldered and threaded, as illustrated in Fig. 1. There are left by this construction two air passages 41, which open into the spaces 3 of Fig. 5. Said boss 40 is provided with a threaded bore in alinement with the bore 38 of the tube 36, but of a smaller diameter.

A nut 42 has an interior screw-thread, by which it fits on the threads of the boss 40, and it is in snug abutment with the shoulder of said boss, as shown. The nut 42 has a concavo-convex flange 43, flaring upwardly, which extends parallel with the adjacent convex bottom of the float chamber 1. The nut 42 has a central threaded socket and a concentric threaded bore or opening of smaller diameter.

A needle valve 44 has a head 45, furnished with a knurled edge. The shank of the needle valve 44 is threaded to engage movably with the threaded bores of the nut 42 and the boss 40. The smooth cylindrical portion of the shank of the needle valve 44 extends vertically and axially through the bore 38 of the tube 36, and has a conical end, by which it is adapted to be seated in the conical depression of the valve aperture 39.

The upper end of the tube 36 is closed by a cap 45, whose tubular portion is longitudinally slitted, as at 46, so as to fit frictionally upon said tube. The cap 45 also has two horizontal slots 47, near its upper end. It is provided with a ring or eye 48 on its upper end.

An annular float 49, made of cork, or other buoyant material, has a radially directed lever arm 50, secured thereto by screws 51. The arm 50 has a slot 52 at its end, and also a round aperture 53, about midway its length. The float 49 surrounds the tube 33, which extends loosely up through the central aperture 54 of said float.

A fulcrum screw 55 passes through the tubular extension 15 on the lower side into the bore thereof. The screw 55 near its end is concentrically reduced, so as to enable the shank, which is there not threaded, to pass loosely through the slot 52 of the float arm or lever 50. The screw 55 terminates at its inner end in a rounded head 56, whose diameter exceeds the width of the slot 52. By means of the slot 52 the arm or lever 50 can be loosely engaged with the reduced portion of the shank of the screw 55, and by means of the headed end 56 of the screw 55 the arm or lever 50 is loosely held in the slot 52 from vertical displacement and has its fulcrum on the reduced portion of the screw 55. A guide screw 57 passes through the tubular extension 15 on the lower side into the bore thereof. The outer end of the shank of the screw 57 is smooth and cylindrical and is adapted to pass loosely through the aperture 53 of the float arm or lever 50.

Upon one side of the tube 4 is an integral boss 58, having an outer straight or plane surface. A stop pin 59 projects from one corner of the plane surface of said boss 58. An air-opening 60 is made through the boss 58 into the bore of the tube 4. This air-opening or port 60 is of an irregular outline or capacity for reasons hereinafter explained.

The opening or port 60 can be closed or opened to the external atmosphere by a valve 61, which is mounted adjustably, but fast on the shaft 13. This valve 61 is essentially or approximately triangular in shape, and has at its upper end two ear-pieces 62, through which a screw 63 passes, so that the circular portion 64 of the clamp is adapted thereby to pinch and firmly hold upon the valve shaft 13. At each lower corner of the valve 61 are curved projections or stops 65, which, as the valve 61 is moved, limit such movement by their contact respectively with the fixed stop 59. A lever arm 66 has a split clamping ring 67, provided with two ear-pieces 68, through which ear pieces a screw 69 passes to hold said clamp fast upon the valve shaft 13. A link bar 70, operated by a lever (not shown), is connected by a pivot 71 to the upper end of the lever arm 66. A throttle valve 72, shown in dotted lines in Fig. 1 and in solid lines in Fig. 2, is mounted by a screw 73 upon the valve shaft 13.

A needle valve 74 has its body portion cylindrical and of a diameter to allow it to fit slidingly in the lower vertical portion of the tube 20. The valve 74 has its base pyramidal in form, and the apex thereof rests upon the upper surface of the float arm or lever 50. The sides of the body portion of the valve 74 are longitudinally fluted or grooved, as illustrated at 75 in Fig. 1. The upper end of the valve 74 is concentrically reduced to form a neck, and terminates in an upwardly-directed, conically-shaped head 76, which is adapted to enter and close the aperture or valve seat 24 in the annular flange 22.

The operation of my improved carbureter is as follows: When the gasolene in the float chamber 1 is below the normal level (represented in Fig. 1 at 77) the float 49 descends and thereby lowers the lever arm 50, which has its fulcrum on the reduced portion of the shank of the screw 55. This movement of the lever arm 50 is limited to a vertical direction by means of the guide screw 57, whose smooth shank extends freely through the aperture 53 of the lever arm 50. When the lever arm 50 so descends, the needle valve 74 descends also, thus withdrawing the conical head 76 of said valve from the valve seat 24. Gasolene from a reservoir (not shown) then freely flows in the direction indicated by the arrow 78, through the pipe 26 and bent tube 20, through the aperture or valve seat 24 and along the longitudinal grooves 75 of the valve body 74, and thence passes through the bore of the tubular extension 15 and opening 14, into the float chamber 1, thus raising the level of the gasolene therein. The float 49 consequently rises, and with it the lever arm 50, which crowds upwardly the needle valve 74 and seats the conical head thereof in the aperture 24, thus stopping the flow of the gasolene from said reservoir into the float chamber 1. The gasolene level in the float chamber 1 is a little below the valve opening 39 of the tube or nozzle 36, 44, as seen in Fig. 1. The gasolene, which passes from the float chamber 1, through the ducts 37 and bore 38 of the nozzle 36 is drawn up out of the orifice or valve opening 39 by the suction of the engine, the conical upper end of the needle valve 44 having been withdrawn from the valve seat 39 by turning the needle valve 44, by its head 45, to the desired degree, to facilitate such discharge. The gasolene so drawn up out of the tube 36 is discharged in a fine stream upon the under surface of the solid end of the cap 45 and is there broken up into spray, which emerges in fan-shaped sheets radially, in outward directions, through the slots 47 of the cap, and there is dissipated into vapor by the strong upward air-currents, caused by the suction of the engine. These air-currents come from the outer atmosphere, up through the openings 3 (Fig. 5) in the direction of the arrows 79 (Fig. 1). As the air-currents, so formed, move up along the bore of the tube 33 with great force and are directed at right angles to the sheets of gasolene spray emerging from the slots 47 of the cap 45, there results a thorough mixture of the gasolene vapor with the atmospheric air. The link bar 70, having been drawn by the chauffeur (by means of an operating lever, not shown), accomplishes two results,—first, the turning of the throttle valve 72 in the tube 4, and, secondly, the opening of the valve 61, thus uncovering the in-take port 60. Consequently, the combined gasolene vapor and air, already mixed and mingled as just explained, are again subjected to a strong current of air drawn into the tube 4 through the port 60 by the suction of the engine, which air current enters the current of mingled gasolene vapor and air at a right angle, and both currents, impinging on the diagonally set throttle valve, are deflected thereby, the total result being the formation of a swirl of mingled gasolene vapor and air, thoroughly mixed and ready to enter the engine to be sparked and exploded in the well-known manner. The spraying of the gasolene is thus seen to be caused by the cap 45 and its slots 47. This cap is slotted longitudinally at 46 and fits snugly over the upper portion and end of the feed tube 36, the close fit and the longitudinal slotting of the cap allowing a slight expansion and causing a frictional engagement of the cap upon said tube. The cap 45 is provided with a ring or eye piece 48, and can be pulled off the tube 36, whenever desired, by means of a wire having a hooked end, which engages said ring or eye piece 48. The slots 47 are preferably of greater width than the diameter of the orifice or valve seat 39, and therefore are not liable to be clogged by any sediment or foreign matter contained in the gasolene, which is discharged from the feed tube 36. The shape and size of the port 60 is to be determined by experiment, so as to give to this supplemental air valve that required capacity to enable it to supply the necessary amount of air for securing the desired degree of richness of the mixture. This intake of the air through the port 60 is indicated by the arrow 80 in Fig. 1 and by the arrow 81 in Fig. 3.

The stops or curved points 65 of the valve 61, by their respective engagements with the stop pin 59, limit the movements of the valve 61. The relative position of the valve 61 on the valve shaft 13 can be changed by loosening the screw 63 and moving the clamp 64 to the desired position, and then tightening the clamp in such position, by drawing together the ear-pieces 62 by means of the screws 63. In like manner, the clamp ears 31 may be loosened, whereupon the vertical portion of the bent tube 20 can be adjusted up or down, and secured in such adjusted position by tightening the screw 32 to engage said ears in closed position. By such adjustment, the bottom of the needle valve 74 presses down to a predetermined extent the lever arm 50 of the float 49, and thereby limits the normal level of the gasolene in the float chamber. By elevating the tube 20 and these parts of the device, the normal level of the gasolene in the float chamber may be raised.

Another advantage of the clamps 31 is that, when the screw 32 is loosened, the tube 20 and its connected parts can be turned to any desirable extent in a horizontal plane, as indicated in Fig. 2, and when so turned said tube 20 is again locked in such position by tightening the screw 32 in the ears 31. In this manner, the carbureter may be connected with the gasolene reservoir, the swiveling of the tube 20, as described, enabling the pipe 26 to take whatever angular direction may be necessary for such connection.

The downward movement of the needle valve 74, when permitted by the descent of the float 49 and lever arm 50, is caused by gravity, aided, however, by the pressure of the gasolene in the reservoir, and pipe 26 and the upper portion of the tube 20, against the head 76 of the needle valve 74.

It is evident that in the construction of my improved carbureter springs are entirely dispensed with as also the usual packings. The tight closure of the cover 5 upon the flange 34 of the tube 33 is effected by the screws 7, through the ear pieces 6 and 2, the flange 34 being in a higher plane than the annular lip or flange 8 of the cover 5, and the upper portion of the tube 33 extending above the flange 34 into the tube 4, as shown.

The flange 43 of the nut 40 is dished to receive whatever drip of gasolene may occur in priming, but its chief function is to give an upward deflection into any back fire from the engine, which may accidentally occur, thus preventing the flame from reaching any gasolene which may happen to be in the dripping pan beneath the carbureter. Any gasolene, which chances to be contained in the dished flange 43 of the nut 40, is lapped up by the air-currents passing into the tube 33, as indicated by the arrows 79.

I claim as a novel and useful invention and desire to secure by Letters Patent:

1. In a carbureter, the combination of a tube; a throttle valve adapted to open or close at will the upper part of said tube; a concentric tube of smaller diameter, extending up into the first named tube from the bottom of the carbureter and having an open bottom accessible to the external atmosphere; a nozzle shorter than said second named tube, concentric with said second named tube and of a smaller diameter than that of the second named tube and having a top which is provided with a central upwardly-directed vent or opening, the latter being made with an interior conical valve seat, concentric with and continuous with said vent or opening; a needle valve having a head and whose shank near said head is screw-threaded, but is elsewhere smooth and cylindrical, which needle valve extends axially up into said nozzle and has a conical end adapted to close said valve seat and vent or opening; a fixed support having a screw-threaded hole in which the threaded part of said shank is engageable; means for supplying gasolene to said nozzle; and a cap fitting upon the said nozzle at its upper end in proximity to said vent or opening, and provided with discharging slots extending radially through the tubular sides of said cap, which are adapted to discharge gasolene spray out into the ascending air currents in the concentric space between said second named tube and said nozzle.

2. In a carbureter, the combination of a tube; a throttle valve adapted to open or close the upper part of said tube at will; a concentric tube of smaller diameter extending up into the first named tube from the bottom of the carbureter and having an open bottom accessible to the external atmosphere; a nozzle shorter than the second named tube, concentric therewith, but of a smaller diameter, provided with a top which has a central vent; a needle valve extending into said nozzle and having a conical head adapted to engage with said vent; a fixed support with which said needle valve is in threaded engagement; means for supplying gasolene to said nozzle; a cap having a solid top and fitting upon the upper end of the nozzle in proximity to the vent thereof and provided with horizontal, radially directed discharging slits extending through the tubular sides of said cap; means for producing air currents up through the concentric space between the second named tube and nozzle; an air admission valve opening into the upper part of said first named tube near the throttle valve; and mechanism for simultaneously operating at will said air admission valve and throttle valve to the same degree.

3. In a carbureter, the combination of a nozzle having a vent; means of supplying gasolene thereto; and a cap having a closed top in close proximity to said vent and a tubular portion by which said cap is frictionally supported on the outer surface of said nozzle at and near the upper end of the latter and having radially-extending horizontal discharging slots.

4. In a carbureter, the combination of a nozzle adapted to discharge a liquid fuel; and a metallic cap comprising a tube and a solid top, which tube is provided with longitudinal slots adapting it to fit frictionally upon the nozzle and also with discharging slots extending transversely through the sides of the tube parallel to and in close proximity with the top of the cap, which cap is supported above the discharging end of said nozzle and is adapted to discharge said liquid fuel in the form of spray.

5. In a carbureter, the combination of a nozzle adapted to discharge gasolene in a fine stream; means for supplying gasolene thereto; a cap fitting upon the end of said nozzle and arranged to receive the impact of said stream and to discharge said gasolene radially in directions at right angles to the direction of said stream; and a ring on the top of said cap and engageable by a hook for detaching said cap from the nozzle.

6. In a carbureter, the combination of a tube; an oscillating throttle valve mounted crosswise in said tube; means for giving an oscillating movement to the throttle valve; a nozzle extending up into said tube; means for supplying gasolene to said nozzle; means for supplying atmospheric air to said tube; a boss extending downwardly from the bottom of said tube and having an exteriorly-threaded, concentrically-reduced end and a central screw-threaded bore; a nut having a screw-threaded socket by which it is engageable with said ends of said boss; an integral dished flange upon said nut for receiving and retaining the drip of gasolene from said nozzle; and a needle valve extending into said nozzle for regulating the discharge of gasolene therefrom, which needle has a portion of its shank screw-threaded to engage the bores of said boss and nut.

7. In a carbureter, the combination of a gasolene float chamber; an inlet tube to convey gasolene thereto; a plurality of ear-pieces extending radially from said float chamber along its upper edge; a cover having an annular lip or flange shutting into the float chamber and also having a plurality of ear-pieces registering with the first named ear-pieces; screws passing respectively through each registering pair of said ear-pieces; and a carbureting tube passing concentrically through said cover and provided with an annular flange, upon which said cover rests snugly by the pressure of said screws, which annular flange of the carbureting tube is above the plane of the lower edge of said annular lip or flange of said cover.

In testimony whereof I affix my signature in presence of two witnesses.

ALBERT HOWARTH.

Witnesses:
ARTHUR P. JOHNSON,
HELEN M. SCATTERGOOD.